(12) United States Patent
Roseman et al.

(10) Patent No.: US 10,325,439 B2
(45) Date of Patent: Jun. 18, 2019

(54) ARTICLE IDENTIFICATION READER, MARKER ELEMENT FOR ARTICLE IDENTIFICATION AND METHOD OF ARTICLE IDENTIFICATION

(71) Applicants: Morton Roseman, Thornhill (CA); Piotr Rudkowski, Thornhill (CA); Grazyna Rudkowska, Thornhill (CA); Arthur Yelon, Thonhill (CA); David Menard, Thornhill (CA); Stephan Brauer, Thornhill (CA)

(72) Inventors: Morton Roseman, Thornhill (CA); Piotr Rudkowski, Thornhill (CA); Grazyna Rudkowska, Thornhill (CA); Arthur Yelon, Thonhill (CA); David Menard, Thornhill (CA); Stephan Brauer, Thornhill (CA)

(73) Assignee: Custom Security Industries, Inc., Thornhill, Ontario (CA)

( * ) Notice: Subject to any disclaimer, the term of this patent is extended or adjusted under 35 U.S.C. 154(b) by 0 days.

(21) Appl. No.: 15/202,236

(22) Filed: Jul. 5, 2016

(65) Prior Publication Data
US 2017/0061724 A1    Mar. 2, 2017

Related U.S. Application Data

(60) Provisional application No. 62/188,561, filed on Jul. 3, 2015.

(51) Int. Cl.
*G07F 7/08* (2006.01)
*G06K 19/06* (2006.01)
*G06K 7/08* (2006.01)

(52) U.S. Cl.
CPC ........... *G07F 7/0873* (2013.01); *G06K 7/086* (2013.01); *G06K 19/06196* (2013.01); *G07F 7/086* (2013.01); *G07F 7/0813* (2013.01)

(58) Field of Classification Search
USPC .......................................... 235/380
See application file for complete search history.

(56) References Cited

U.S. PATENT DOCUMENTS

| | | |
|---|---|---|
| 3,820,090 A | 6/1974 | Wiegand |
| 5,175,419 A | 12/1992 | Yamashita |
| 5,204,526 A | 4/1993 | Yamashita et al. |
| 5,538,803 A | 7/1996 | Gambino et al. |
| 5,729,201 A | 3/1998 | Jahnes et al. |

(Continued)

FOREIGN PATENT DOCUMENTS

| | | |
|---|---|---|
| EP | 0295085 | 11/1996 |
| EP | 1039412 | 9/2000 |

(Continued)

*Primary Examiner* — Rafferty D Kelly
(74) *Attorney, Agent, or Firm* — Fay Sharpe LLP

(57) ABSTRACT

A reader for article identification comprises one or more solenoids configured to generate a magnetic field for locally exciting portions of a marker element carrying at least one data feature as the marker element moves through the magnetic field and for causing the marker element to generate a varying magnetic field; and one or more giant magnetoimpedance (GMI) sensors upstream of the one or more solenoids configured to detect the varying magnetic field and produce output based on the varying magnetic field.

22 Claims, 6 Drawing Sheets

(56) References Cited

U.S. PATENT DOCUMENTS

| | | | |
|---|---|---|---|
| 5,821,859 A | 10/1998 | Schrott et al. | |
| 5,965,214 A | 10/1999 | Crossfield et al. | |
| 6,144,300 A | 11/2000 | Dames | |
| 6,204,766 B1 | 3/2001 | Crossfield et al. | |
| 6,289,141 B1 | 9/2001 | Roseman | |
| 6,323,770 B1 | 11/2001 | Dames | |
| 6,356,197 B1 * | 3/2002 | Patterson | G06K 19/0723 340/572.1 |
| 7,320,433 B2 | 1/2008 | Hasegawa | |
| 2014/0266175 A1 * | 9/2014 | Hattersley | G01R 33/0213 324/243 |

FOREIGN PATENT DOCUMENTS

| | | |
|---|---|---|
| EP | 0713195 | 10/2000 |
| EP | 0839330 | 7/2002 |
| GB | 2349049 | 10/2000 |
| GB | 2349051 | 10/2000 |
| WO | WO 96/31790 | 10/1996 |
| WO | WO 98/13708 | 4/1998 |
| WO | WO 98/15851 | 4/1998 |
| WO | WO 99/35610 | 7/1999 |
| WO | WO 99/67099 | 12/1999 |
| WO | WO 00/10123 | 2/2000 |
| WO | WO 01/11541 | 2/2001 |
| WO | WO 01/13321 | 2/2001 |
| WO | WO 01/26049 | 4/2001 |
| WO | WO 02/084608 | 10/2002 |
| WO | WO 03/017192 | 2/2003 |
| WO | WO 08/020148 | 2/2008 |

* cited by examiner

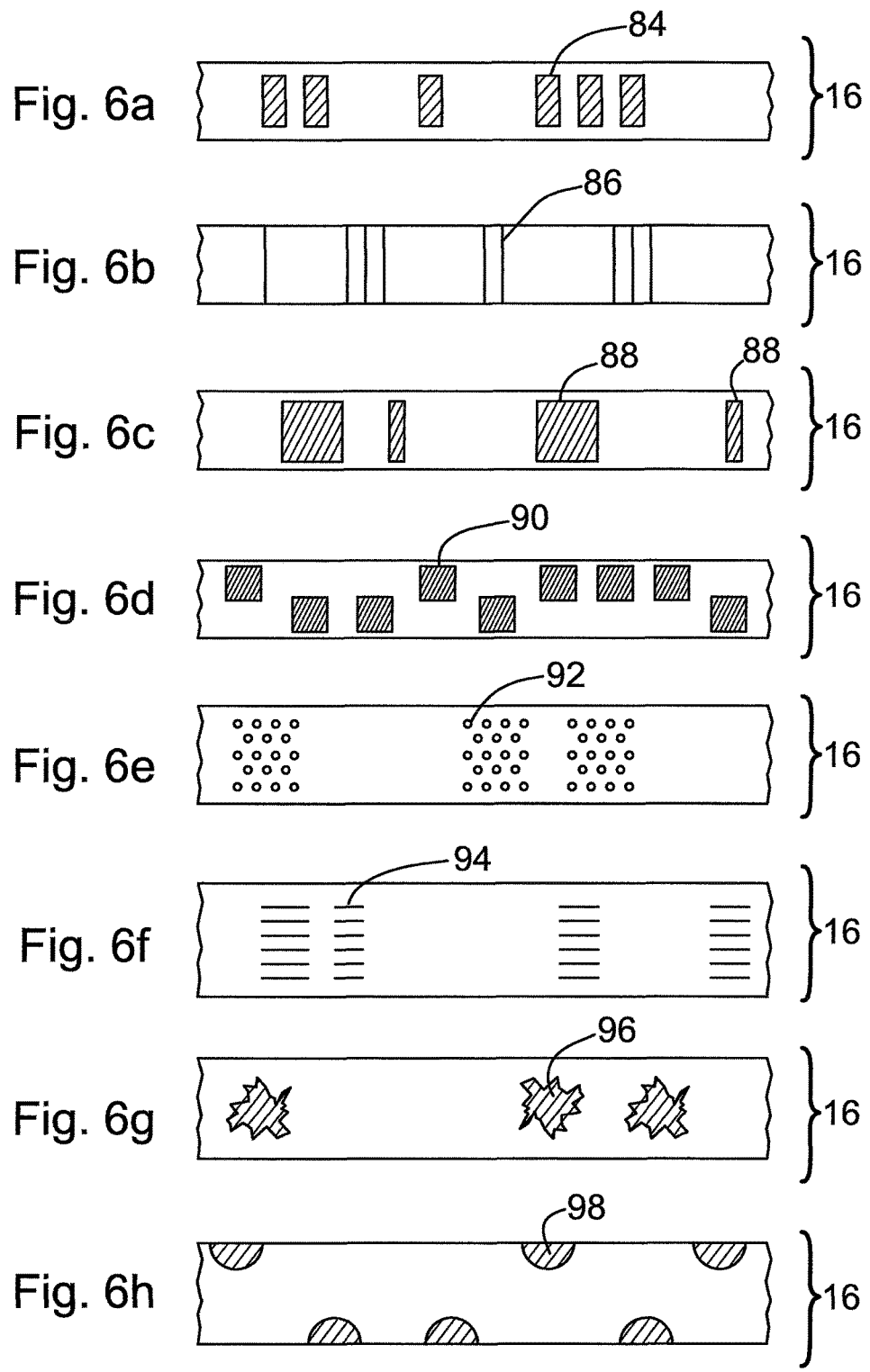

ARTICLE IDENTIFICATION READER, MARKER ELEMENT FOR ARTICLE IDENTIFICATION AND METHOD OF ARTICLE IDENTIFICATION

CROSS REFERENCE TO RELATED APPLICATIONS

This application claims the benefit of U.S. Provisional Application No. 62/188,561 filed on Jul. 3, 2015, the content of which is incorporated by reference in its entirety.

FIELD

The subject application relates to article identification and in particular, to an article identification reader, a marker element for article identification and a method of article identification.

BACKGROUND

Article identification systems are well known and are used in a variety of applications to prevent unauthorized access to physical locations, electronic data etc. or to ensure the validity of articles. For example, systems are known in which re-writable digital information is encoded into a magnetic marker element by creating adjacent regions along the magnetic marker element with alternating directions of remnant magnetization. The encoded digital information can subsequently be read from the marker element using a magnetic reader that includes a solenoid coil to pick up a magnetic signal induced by the regions of alternating remnant magnetization as the marker element is moved past the magnetic reader. Systems of this kind have been widely used to identify plastic cards such as credit and debit cards and many types of paper tickets. The magnetic element is typically in the form of a stripe and is commonly made from particulate or continuous magnetic media with coercivity greater than approximately 25 kA/m (300 Oe).

Other article identification systems based on volatile magnetic components have been proposed (see for example, International PCT Application Publication No. WO 98/13708, U.K. Patent No. 2349049, International PCT Application Publication No. WO 08/020148, U.S. Pat. No. 6,204,766, European Patent No. 0839330, European Patent No. 0295085, and U.S. Pat. No. 5,729,201, which are all incorporated herein by reference).

Other systems are known to prevent the unauthorized recording or modification of encoded data, as in security applications. In particular, access control systems are known where discrete magnetic Wiegand wire segments are assembled by a mechanical process into door-access key cards. When such a key card is swept past a suitable reader, the relative locations of the wire segments are decoded as they pass in proximity to one or more magnetic excitation zones and one or more magnetic pickup heads in the reader, and the resulting decoded data is used to identify the key card. To ensure an adequate pick-up signal, the wire segments are commonly made from bi-stable magnetic wire with a switching field near 2 kA/m (25 Oe) (see for example, U.S. Pat. No. 3,820,090, which is incorporated herein by reference). Security against counterfeiting of the key cards is provided by two main mechanisms: 1) the wire segments provide a magnetic response which is sufficiently distinct as to permit the reader to differentiate such wire segments from other types of magnetic materials more generally available; and 2) physical placement of the wire segments requires relatively high precision, and processes for such wire segment placement are not easily developed.

In addition to the systems described above, which use semi-hard magnetic materials, non-volatile soft-magnetic data markers have been considered (see for example, International PCT Application Publication No. WO 00/10123, International PCT Application Publication No. WO 99/67099, International PCT Application Publication No. WO 01/26049, U.S. Pat. No. 6,289,141, International PCT Application Publication No. WO 03/017192, European Patent Application No. 1039412, U.S. Pat. Nos. 6,144,300, 5,965,214, 5,538,803, and 5,821,859, which are all incorporated herein by reference), as have readers for such data markers (see for example, International PCT Application Publication No. WO 98/15851, U.K. Patent No. 2349051, International PCT Application Publication No. WO 01/13321, U.S. Pat. No. 6,323,770, and International PCT Application Publication No. WO 01/11541, which are all incorporated herein by reference), and combined systems of data markers and readers (see for example, International PCT Application Publication No. WO 96/31790, International PCT Application Publication No. WO 99/35610, International PCT Application Publication No. WO 02/084608, U.S. Pat. No. 7,320,433, European Patent No. 0713195, U.S. Pat. Nos. 5,175,419, and 5,204,526, which are all incorporated herein by reference).

Although various article identification systems and readers therefor have been considered, improvements are desired. It is therefore an object to provide a novel article identification reader, a marker element for article identification and a method of article identification.

SUMMARY

Accordingly, in one aspect of the subject disclosure there is provided a reader for article identification comprising: one or more solenoids configured to generate a magnetic field for locally exciting portions of a marker element carrying at least one data feature as the marker element moves through the magnetic field and for causing the marker element to generate a varying magnetic field; and one or more giant magnetoimpedance (GMI) sensors upstream of the one or more solenoids configured to detect the varying magnetic field and produce output based on the varying magnetic field.

In one embodiment, the magnetic field generated by the solenoid causes magnetic dipoles of marker element material to flip thereby to cause the marker element to generate the varying magnetic field.

In another embodiment, the solenoid coil is driven by a probe field drive circuit. In another embodiment, the probe field drive circuit operates in the range of 1 to 100 kHz.

In another embodiment, the one or more GMI sensors is driven by an alternating current driving circuit. In another embodiment, the alternating current driving circuit operates in the range of approximately 0.1 to 50 GHz.

In another embodiment, each GMI sensor comprises amorphous-metal wire or fiber, a metal wire or fiber comprised of one or more layers of soft-magnetic material and an electroplated metal wire or fiber as part of the GMI sensor.

In another embodiment, the reader further comprises a decoding module configured to decode the output produced by the one or more GMI sensors.

In another embodiment, the output produced by the one or more GMI sensors is used to determine if the marker element is valid.

In another embodiment, the marker element is applied to an article.

In another embodiment, the article is an access key card.

According to another aspect of the subject disclosure there is provided a marker element comprising: a plurality of data features encoded on the marker element by modifying at least one of the electrical conductivity, magnetic coercivity, magnetic permeability and magnetic saturation of marker element material at spaced apart regions along the marker element, wherein the marker element generates a varying magnetic field detectable by one or more giant magnetoimpedance (GMI) sensors when the marker element passes through a localized excitation magnetic field.

In one embodiment, the marker element is made from any one of continuous or particulate soft-magnetic material, continuous or particulate electrically conductive material, amorphous alloy, printed ink that is at least one of conductive and magnetic, and continuous strips, wires or fibers.

In another embodiment, the data features are encoded using: localized heating, such as by laser light or electrical discharge, to create or change the material and/or geometrical properties in the spaced apart regions; mechanical cutting, punching, or forming to create or change the material and/or geometrical properties in the spaced apart regions; deposition such as electro deposition, vacuum deposition, chemical deposition, to create or change the material and/or geometrical properties in the spaced apart regions; ablation to create or change the material and/or geometrical properties in the spaced apart regions; chemical reaction to create or change the material and/or geometrical properties in the spaced apart regions; and printing to create or change the material and/or geometrical properties in the spaced apart regions.

In another embodiment, the marker element is in the form of a ribbon or sheet with data encoded in two dimensions.

According to another aspect of the subject disclosure there is provided a method of article identification comprising: passing a marker element through a localized excitation magnetic field generated by at least one solenoid to successively excite portions of said marker element; detecting a resultant varying magnetic field generated by the marker element; and producing a detection signal based on the detected varying magnetic field.

In one embodiment, the method further comprises decoding the detection signal.

In one embodiment, the method further comprises evaluating the detection signal to produce a decision signal to validate the marker element.

BRIEF DESCRIPTION OF THE DRAWINGS

Embodiments will now be described more fully with reference to the accompanying drawings in which:

FIGS. 6a to 6h are partial plan views of marker elements for use with the readers for article identification.

DETAILED DESCRIPTION

Figure 1:
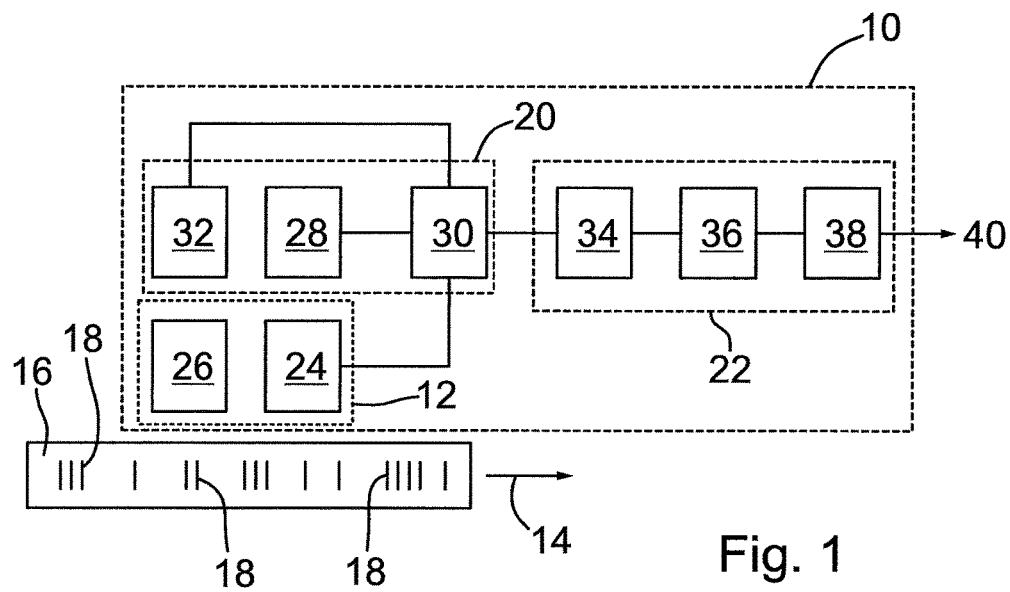
FIG. 1 is a schematic block diagram of a reader for article identification.
Figure 2:
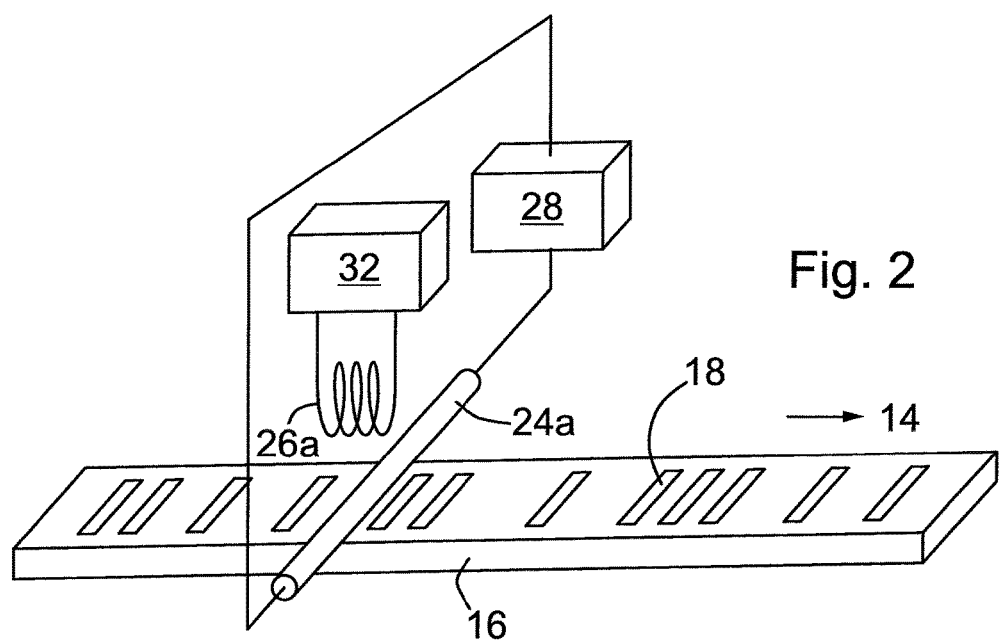
FIG. 2 is a schematic perspective view of a read head and read head drive and sense circuitry forming part of the reader of FIG. 1.

Turning now to FIGS. 1 and 2, a reader for article identification is shown and is generally identified by reference numeral 10. The reader 10 comprises a read head 12 positioned adjacent a read path indicated by arrow 14 along which a marker element 16 carrying encoded data is to be moved. In this embodiment, the encoded data is embodied by data features 18 carried by or formed in the marker element 16 as will be described. The reader 10 also comprises drive and sense circuitry 20 for the read head 12 and processing circuitry 22 configured to decode and evaluate encoded data read from the marker element 16 allowing the marker element 16 to be evaluated.

In this embodiment, the read head 12 comprises a giant magnetoimpedance (GMI) sensor arrangement 24 and a solenoid arrangement 26 positioned upstream of the GMI sensor arrangement 24 along the read path 14. The GMI sensor arrangement 24 comprises one or more GMI sensors 24a and the solenoid arrangement 26 comprises one or more solenoids 26a. For illustrative purposes only, FIG. 2 shows a single GMI sensor 24a and a single solenoid 26a.

The drive and sense circuitry 20 for the read head 12 comprises an alternating current (AC) drive circuit 28, detection electronics 30 and a probe field drive circuit 32. The AC drive circuit 28 is connected to the GMI sensor arrangement 24 and to the detection electronics 30. The detection electronics 30 is also connected to the probe field drive circuit 32 that in turn is connected to the solenoid arrangement 26.

The processing circuitry 22 comprises a signal processing module 34, a decoding module 36 and an evaluation module 38. The signal processing module 34 is connected to the detection electronics 30 and to the decoding module 36. The decoding module 36 in turn is connected to the evaluation module 38, which produces decision signal output 40 of the reader 10.

In general, the read head 12, via the probe field drive circuit 32 and the solenoid arrangement 26, is configured to generate a localized excitation magnetic field that intersects the read path 14. When the marker element 16 is moved along the read path 14 in proximity to the read head 12 and into the localized excitation magnetic probe field, the magnetic probe field excites the portion of the marker element 16 within magnetic probe field causing the portion of the marker element 16 to generate a resultant magnetic field that is sensed by the GMI sensor arrangement 24 and detected by the detection electronics 30. The resultant magnetic field generated by the portion of the marker element 16 within the localized excitation magnetic field will vary depending on whether a data feature 18 exists at the portion of the marker element or not. In this manner, as the marker element 16 is advanced along the read path 14, the detection electronics 30 detects the pattern of data features 18 on the marker element 16. The processing circuitry 22 in turn generates an output string representing the data feature pattern that is then decoded and evaluated to determine if the data feature pattern on the marker element 16 represents a valid code. Further specifics of the reader 10 will now be described.

Each GMI sensor 24a of the GMI sensor arrangement 24 is constructed from a conductive soft-magnetic member of high geometric aspect ratio, such as a wire or filament. The AC drive circuit 28 is configured to drive each GMI sensor 24a by causing an AC current having a high frequency in the range of approximately 100 kHz to 50 GHz to run through the GMI sensor 24a. If desired, the frequency of the AC current may be confined to a subrange of the high frequency range noted above. For example, the subrange may be in the range of approximately 1 GHz to 10 GHz. The frequency of the AC current is selected such that combined magnetic switching and electrical currents within the marker element 16 give rise to one or more resonances where the impedance of the GMI sensors 24a is strongly dependent on the excitation magnetic probe field experienced by the marker element 16.

To determine the high frequency impedance of each GMI sensor 24a of the GMI sensor arrangement 24, the average, RMS or peak voltage across the GMI sensor is measured at constant or near constant AC drive current. A measure of the magnetic field at the GMI sensor 24a may be determined from circuits that sense the phase angle between the GMI sensor current and voltage, or the harmonic content (distortion) of these.

Each GMI sensor 24a has very high magnetic field sensitivity and a small interrogation region. The reader 10 is therefore able to sense localized magnetic fields generated by the marker element 16 and as a result, read encoded data carried by the marker element 16 within a much broader range of conductive and/or magnetic materials and structures, including many where the magnetic signal is much weaker, as compared to prior art systems. The ability to sense localized magnetic fields generated by the marker element also serves to better differentiate between different types of marker elements 16, providing higher security against the use of counterfeit marker elements. The GMI sensor 24a has advantages in regard to sensitivity, sensor size, spatial resolution, magnetic field response, time response, simplicity, and cost over conventional sensors.

The probe field drive circuit 32 connected to the solenoid arrangement 26 drives each solenoid 26a of the solenoid arrangement causing the solenoid 26a to generate the localized excitation magnetic probe field. The frequency of the localized excitation magnetic probe field is lower than the high frequency of the AC current used to drive the GMI sensors 24a of the GMI sensor arrangement 24. In this embodiment, the magnetic probe field frequency is in the range of approximately 1 to 100 kHz. If desired, the frequency of the magnetic probe field may be confined to a subrange of the range noted above. For example, the subrange of the localized excitation magnetic probe field may be in the range of approximately of 10 to 50 kHz. The frequency of the localized excitation magnetic probe field is chosen to highlight the pattern of the data features 18 on the marker element 16, as will be discussed further below.

The marker element 16 is made of materials that are conductive, soft-magnetic or both. Soft magnetic materials offer the advantage of having large magnetic response even in the presence of a small localized excitation magnetic probe field, making them, and data features 18 within them, more easily recognizable. Non-magnetic materials must offer sufficient conductivity so that eddy currents induced by the localized excitation magnetic probe field within the marker element 16 result in the generation of an adequate magnetic field that can be sensed by the GMI sensor arrangement 24.

The marker element 16 may take one of a variety of shapes. For example, the marker element 16 may be in the form of a fiber, wire, ribbon, strip, film, solid, or a combination of these. The marker element 16 in this embodiment has low coercivity. This is in contrast to prior art systems that aim to maintain high coercivity in marker element materials in order to prevent accidental de-magnetization. Low coercivity materials require an excitation magnetic probe field to determine the magnetic characteristics of the materials. The excitation magnetic probe field causes the magnetic dipoles of low coercivity materials to flip resulting in the generation of a magnetic field as will be described.

In the embodiment shown in FIGS. 1 and 2, the marker element 16 is in the form of an amorphous metal ribbon with soft-magnetic properties having a width in the range of approximately 0.2 to 3 mm. If desired, the width of the ribbon may be confirmed to a subrange of the range noted above. For example, the subrange may be in the range of approximately 0.5 to 1 mm. The soft magnetic properties of the marker element 16 lead to larger signals in the read head 12. Suitable ribbons are available from Hitachi Metals Inc.™. Of course other materials such as Permalloy may be used to form the marker element 16.

The marker element 16 offers enhanced security against counterfeiting. Firstly, the non-volatile magnetic signature of the marker element 16 is sufficiently unique as to permit the reader 10 to differentiate the marker element 16 from other magnetic materials and constructions. Secondly, manufacturing of the marker element 16 requires processes where both position and deposited energy of the writing tool used to form the data features 18 must be controlled to high precision, and such processes are not easily developed. The marker element 16 is amenable to manufacture at low cost. The small size of the marker element 16 permits the marker element 16 to be easily integrated into articles or objects for identification purposes as will be described.

The pattern of the data features 18 on the marker element 16 represents "0's" and "1's" and thus, represents a digital binary data string. In this embodiment, the presence of a data feature 18 represents a "1" and the absence of a data feature 18 represents a "0". Those of skill in the art will however, appreciate that other data encoding configurations are possible. For example, the presence of a data feature 18 may represent a "0" and the absence of a data feature 18 may represent a "1". Alternatively, the pattern of the data features 18 may represent data of another form such as hexadecimal.

In this embodiment, the data features 18 are created on the marker element 16 by laser annealing lines or linear regions on a surface of the marker element 16 at controlled spacings along the marker element length. The deposited laser energy is sufficient to effect local microstructural changes in the marker element 16, which in turn alter the magnetic behavior of the annealed lines or regions to the localized excitation magnetic probe field generated by the solenoids 26a and thus, alter the magnetic field generated by the marker element 16.

The detection electronics 30 employ demodulation techniques and/or lock-in amplification techniques at or near the frequency of the localized excitation probe magnetic field to sense changes in the properties of the magnetic field emanating from the marker element 16. The properties comprise amplitude, orientation, phase and harmonic content.

The signal processing module 34 comprises at least one of analog and digital electronics to process the output of the detection electronics 30 and generate an output string representing the pattern of data features 18 on the marker element 16. In this embodiment, the signal processing module 34 outputs a logic level 1 if a data feature 18 is suitably positioned with respect to the read head 12, and logic level 0 otherwise. To provide greater discrimination against false readings, if desired, the signal processing module 34 may be configured to output a logic level 0 only if the correct type of marker element 16 is near the read head 12, but with no data feature 18 suitably positioned.

The decoding module 36 receives the output string from the signal processing module 34 and decodes the output string to determine if the decoded output string represents a valid code within the data coding scheme used for article identification. It will be understood that a variety of data coding schemes could be implemented to serve different applications. Article identification may for example require that the data represented in the relative dimensions and/or relative positions of the data features 18 on the marker element 16 be recognized, within assigned tolerances, in the timing and/or relative timing of the data sequence received by the decoding module 36. Coding schemes may use more than two logic levels if the reader 10 is able to discriminate multiple types of data features 18. Identifiable data features 18 may be included to mark the beginning or end of a data sequence, and the data scheme may include self-consistency features and/or encryption features.

If desired, additional sensors may be incorporated into the reader 10 to improve discrimination or reliability of the decoding process. For example, one or more optical sensors could be used to detect the presence or speed of suitable objects near the read head 12 that carry marker elements 16.

The evaluation module 38 receives the output of the decoding module 36 and generates decision signal output 40 based on the decoded output string. The evaluation process may take advantage of pre-programmed rules and/or comparisons with stored data. The decision signal output 40 may be in the form of a logic level, a switching level, a relay action, a digital communication, or an encrypted digital communication that is conveyed to an appropriate downstream location. The decision signal output may be transmitted over wired communications (e.g. galvanically, optically etc.), over wireless communications (e.g. radio frequency etc.), or over a combination thereof. The decision signal output 40 may for example be used to grant access to a location when the marker element 16 is acceptable and security to be informed when the marker element is not acceptable. The reader 10 can thus validate the authenticity or provenance of an article to which the marker element 16 is affixed.

In operation and as mentioned above, when the marker element 16 is moved along the read path 14 in proximity to the read head 12 and into the localized excitation magnetic probe field generated by the solenoid arrangement 26, the localized excitation magnetic probe field excites electrical currents and/or magnetic domain motions within the portion of marker element 16 excited by the magnetic probe field. As previously stated, by the virtue of the low coercivity of the marker element 16, the localized excitation magnetic probe field causes magnetic dipoles of the marker element material to flip resulting in a magnetic field being generated by the marker element that is sensed by the GMI sensor arrangement 24 and this generated magnetic field will vary depending on whether or not a data feature exists at the excited portion of the marker element 16. Thus, as the marker element 16 passes by the read head 12 a varying magnetic field is generated by the marker element 16 that is picked up by the GMI sensor arrangement 24 and detected by the detection electronics 30. Depending on the geometry, the GMI sensor arrangement 24 may also intercept a portion of the localized excitation magnetic probe field directly. Thus, the read head 12 may dynamically sense the response of the marker element 16 to provide a measurement of the localized excitation magnetic probe field.

As will be appreciated, the relative displacement between the marker element 16 and the reader 10 causes a variation in the signal detected by the GMI sensor arrangement 24. For example, when the marker element 16 is moved past the read head 12 at a relatively uniform speed, the time-variation of the signal output of the signal processing module 32 can be processed by the decoding module 34 to determine if the time-variation of logic levels represents valid data within the data coding scheme.

Figure 3:
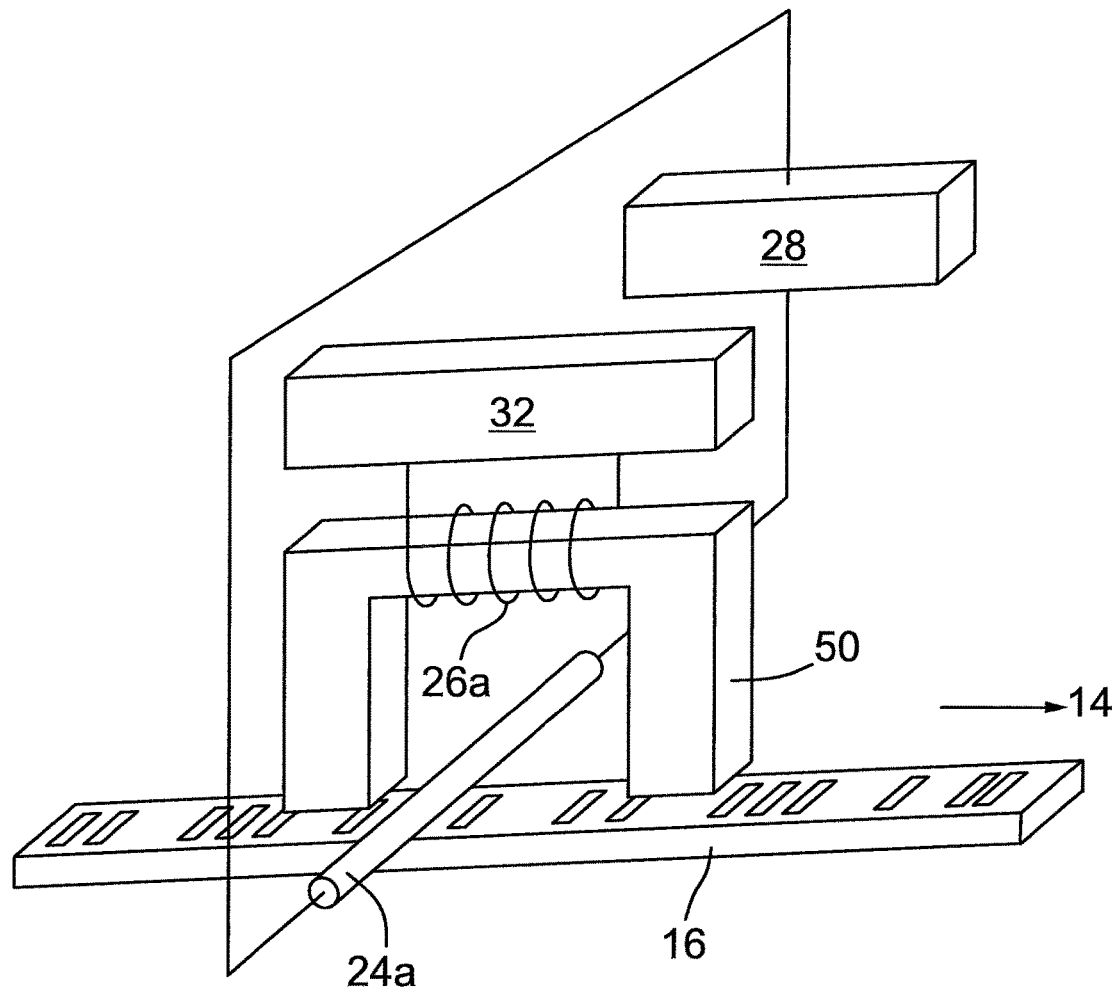
FIG. 3 is a schematic block diagram of an another embodiment of the read head and read head drive and sense circuitry.

Turning now to FIG. 3, another embodiment of a read head and drive and sense electronics for the read head is shown. In this embodiment, the solenoid 26a is wrapped around a magnetic circuit 50 through which the GMI sensor 24a passes. The magnetic circuit 50 comprises a narrow gap and tapered poles to achieve a desired localized excitation magnetic probe field orientation and distribution. The magnetic circuit 50 creates a larger-amplitude and/or a more spatially localized excitation magnetic probe field as compared to the localized excitation magnetic probe field created by the read head 12 of FIGS. 1 and 2. In this manner, only a small region of the marker element 16 is optimally excited at any time. The magnetic circuit 50 also reduces the amount of the excitation magnetic probe field that is sensed by the GMI sensor arrangement 24 directly. This increases the sensitivity of the reader 10 to the magnetic field radiated by the marker element 16.

Figure 4:
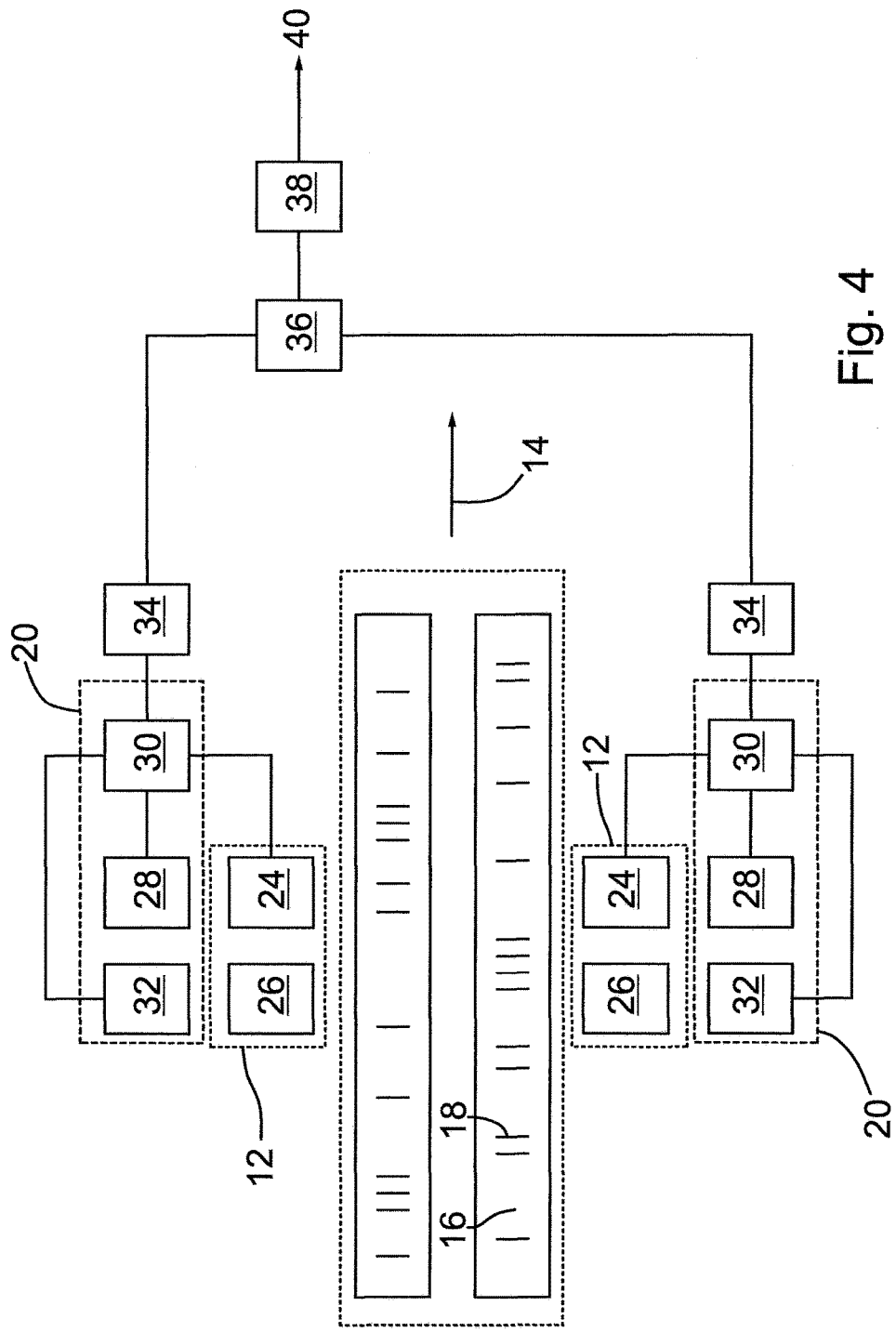
FIG. 4 is a schematic block diagram of another reader for article identification.

Turning now to FIG. 4, another embodiment of a reader for article identification system is shown and is generally identified by reference numeral 40. In this embodiment, reader comprises a pair of read heads 12 and drive and sense electronics 20 for each read head. A separate signal processing module 34 is provided for each drive and sense electronics. The signal processing modules 34 provide output strings to a common decoding module 36. Thus, this reader allows two marker elements 16 carrying data features 18 on an article to be read simultaneously. As will be appreciated, the reader resembles those used in known Wiegand wire card-access systems.

In this embodiment, the coding scheme of the decoder moduling 36 requires that at each lengthwise position along the article there is no more than one data feature. When the read heads 12 are located at the same position along the read path 14, the two data output strings received by the decoding module 36 will be temporally exclusive and may be used to create one combined binary level sequence. A similar coding scheme is envisioned for read heads which are not at the same location along the read path. As will be appreciated, this reader is advantageously less sensitive to sweep speed, sweep speed variations and false identifications compared to prior art systems.

When two marker elements 16 are positioned parallel to each other, data features 18 can be written by laser annealing into alternately one or the other along the length of the two marker elements 16. The reader as shown in FIG. 4 can then be used to read data including features to identify the start and stop of the data, within a predetermined coding scheme. This mode offers improved immunity to erroneous or false readings.

Although the reader is shown with two read heads 54, those of skill in the art will appreciate that a larger number of read heads and marker elements per object may be identified.

While the detection electronics 30, signal processing module 34, decoding module 36 and evaluation module 38 have been shown to be incorporated within the readers, those of skill in the art will appreciate that these elements may reside partly within the readers or outside the readers.

Although the data features are described above as being in the form of laser annealed lines or linear regions, alternatives are available. For example, the data features 18 of the marker element 16 may take the form of regions, spots, or patterns, distributed in one or two dimensions. The spaced-apart data features 18 may be formed of substantially the same material as the bulk material of the marker element 16 with one or more different material properties, or they may be of a different material. The data feature material properties may differ in relation to at least one of microstructure, chemical composition, strain, structural-relaxation, crystalline fraction, crystallographic phases, phase separation, surface-crystallization, grain size distribution, anisotropy, electrical conductivity, magnetic properties and texture on the surface or within the volume of the marker element 16. The data features 18 of the marker element 16 may also locally modify the shape of the marker element by altering its width, thickness, curvature, surface finish, surface plane etc.

Figure 5A:
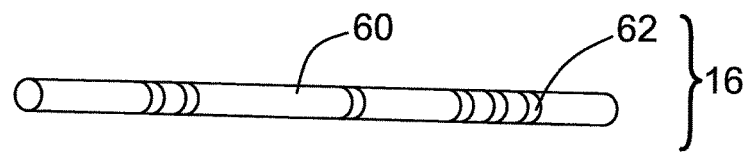
FIGS. 5a to 5f are partial perspective views of marker elements for use with the readers for article identification.
Figure 5B:
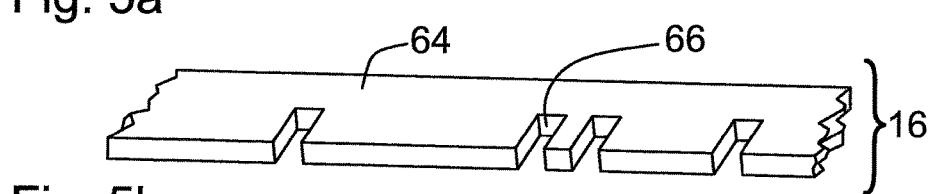
Figure 5C:
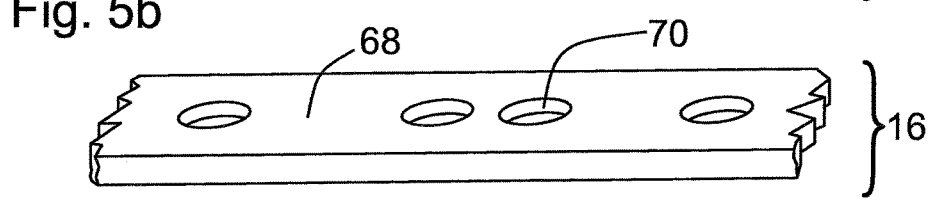
Figure 5D:
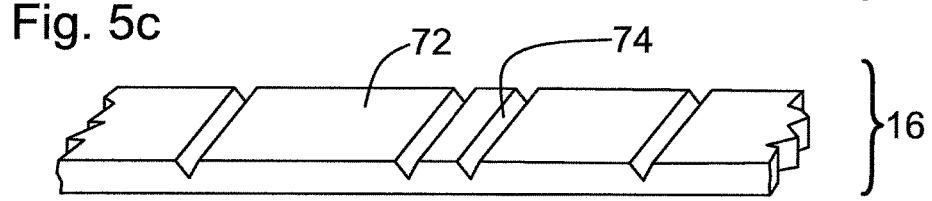
Figure 5E:
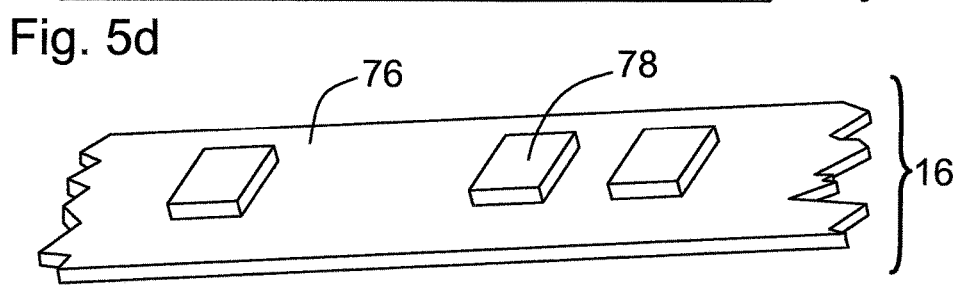
Figure 5F:
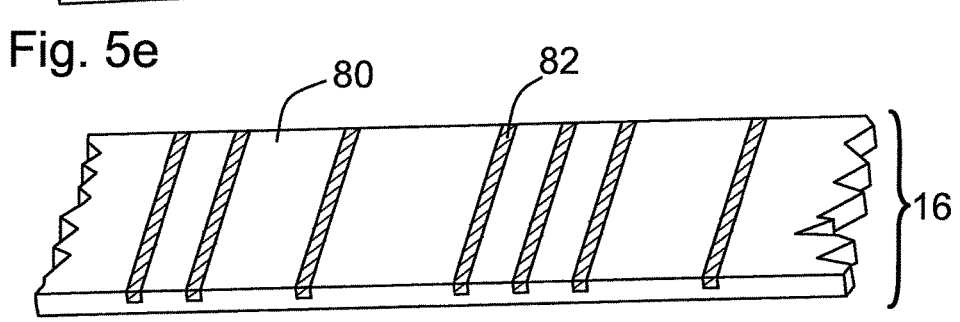

Turning now to FIGS. 5a to 5f, other exemplary marker elements and data features are shown. In another embodiment as shown in FIG. 5a, the marker element is in the form of a wire 60 with data features 62 provided along the wire length. In another embodiment as shown in FIG. 5b, the marker element is in the form of a ribbon 64 with data features in the form of notches 66 along the ribbon length. In another embodiment as shown in FIG. 5c, the marker element is in the form of a ribbon 68 with data features in the form of punched holes 70 along the ribbon length. In another embodiment as shown in FIG. 5d, the marker element is in the form of a ribbon 72 with data features in the form of grooves 74 on one surface along the ribbon length. In another embodiment as shown in FIG. 5e, the marker element is in the form of a ribbon 76 with data features in the form of individual segments 78 of electrically conductive and/or magnetic materials positioned on one or more substrates with contrasting conductive and/or magnetic properties. In another embodiment as shown in FIG. 5f, the marker element is in the form of a ribbon 80 with data features 82 provided along the length of the ribbon.

Other forms of data features are possible as shown in FIGS. 6a to 6h. In one embodiment as shown in FIG. 6a, the data features 84 are rectangular and do not traverse the entire width of the marker element. In another embodiment as shown in FIG. 6b, the data features take the form of linear data features 86, which traverse the entire width of the marker element. In another embodiment as shown in FIG. 6c, the data features 88 have two types of shapes. In another embodiment as shown in FIG. 6d, the data features 90 are arranged in two rows on the same marker element. In another embodiment as shown in FIG. 6e, the data features take the form of patterns of spots 92. In another embodiment as shown in FIG. 6f, the data features take the form of patterns of lines 94. In another embodiment as shown in FIG. 6g, the data features have irregular shapes, but controlled spacing. In another embodiment as shown in FIG. 6h, the data features 98 are arranged in two rows along the edges of the same marker element.

Figure 7A:
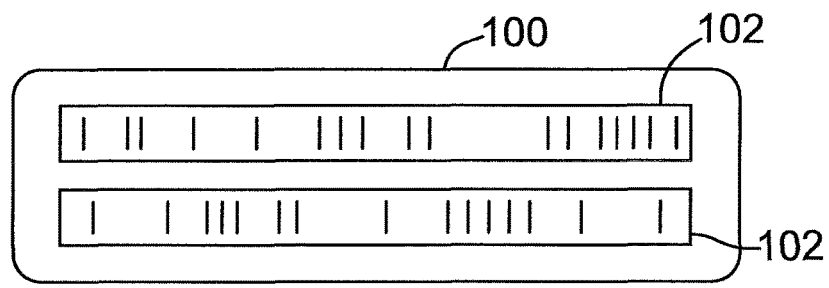
FIGS. 7a and 7b are plan views of articles carrying marker elements.
Figure 7B:
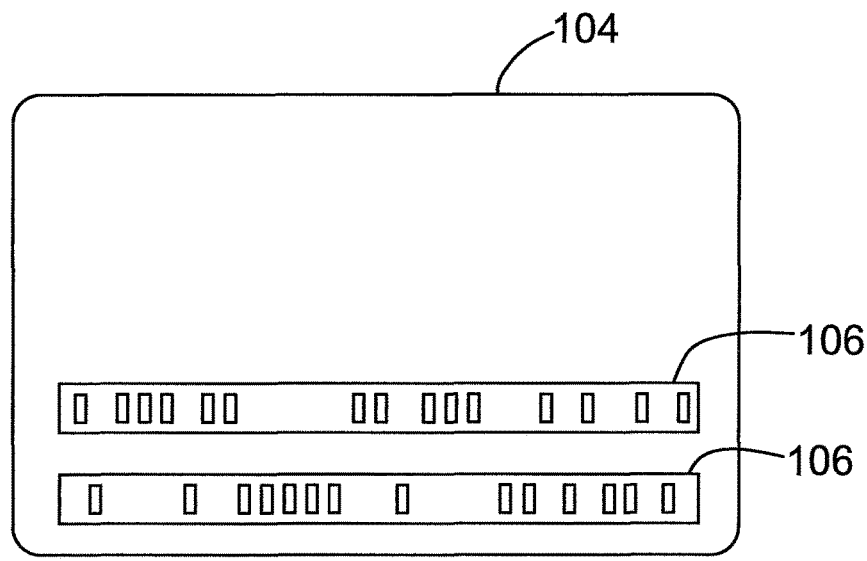

Turning now to FIGS. 7a and 7b, marker elements are shown that are combined on the same article to create more complex data features sets. For example, FIG. 7a depicts an article 100 comprising two marker elements 102. The marker elements 102 are integrated into an adhesive label affixed to article 100. Alternatively, the marker elements 102 may be affixed to the article 100 by lamination or by other means.

FIG. 7b depicts an article 104 comprising two maker elements 106 affixed to the lower half of the article 104. In this embodiment the article 104 is a baggage tag. In another embodiment, the article 104 is a card, such as a door access card or financial transaction card.

For the articles 100 and 104 carrying multiple marker elements 104 and 106, respectively, the data features of the marker elements 104 and 106 are written onto the marker elements 104 and 106 only after the marker elements 104 and 106 have been assembled or installed onto or into the articles 100 and 104, in order to better control registration between data features and/or other features on the articles 100 and 104.

Marker elements may be positioned in relation to edges or other reference points on the article to facilitate more controlled location and relative motion of the article with respect to the reader.

The following methods may be used to impart data features to marker elements comprised of conductive or soft-magnetic materials: localized heating, laser annealing, Joule heating, electrical discharge, localized mechanical deformation and localized chemical reaction.

The following methods may be used to form marker elements: electro deposition, vacuum deposition, chemical deposition and printing.

The following methods may be used to manufacture marker elements with data features based on spaced apart regions with differentiating geometric properties: die cutting, punching, stamping, etching, ablating, forming, laser cutting, laser ablation and chemical etching.

While a particular GMI sensor arrangement has been described, those of skill in the art will appreciate that others are possible. For example, each GMI sensor may be in the form of an amorphous metal GMI fiber sensor and a soft magnetic circuit to localize the magnetic probe field to a small interrogation region on the marker element 5. The fiber is preferably made from a rapid solidification process with subsequent thermal and/or magnetic treatment to optimize the GMI response. Suitable fibers are available from MXT Inc.™.

It will be understood by those of skill in the art that other geometrical positions and orientations of reader components, marker elements, data features, and read path directions may be employed.

Although embodiments have been described above with reference to the drawings, those of skill in the art will appreciate that variations and modifications may be made without departing from the scope thereof as defined by the appended claims.

What is claimed is:

1. A reader for electronic article identification comprising:
at least one read head positioned adjacent a read path along which an article to be identified is to be moved, said article having at least one marker element thereon that carries encoded data, said at least one read head comprising:
one or more solenoids configured to generate a localized magnetic field that intersects said read path for locally exciting portions of the at least one marker element as the at least one marker element moves through the localized magnetic field and for causing the at least one marker element to generate a magnetic field that varies depending on the encoded data at said excited portions;
one or more giant magnetoimpedance (GMI) sensors configured to detect the magnetic field generated by the at least one marker element; and detection circuitry configured to generate output representing the encoded data based on the magnetic field detected by the one or more GMI sensors; and processing circuitry configured to decode and evaluate the output generated by the detection circuitry.

2. The reader of claim 1, wherein the localized magnetic field is for causing magnetic dipoles of marker element material to flip thereby to cause the at least one marker element to generate the magnetic field.

3. The reader of claim 1, wherein the one or more solenoids is driven by a probe field drive circuit.

4. The reader of claim 3, wherein the probe field drive circuit operates in the range of 1 to 100 kHz.

5. The reader of claim 1, wherein the one or more GMI sensors is driven by an alternating current drive circuit.

6. The reader of claim 5, wherein the alternating current drive circuit operates in the range of approximately 0.1 to 50 GHz.

7. The reader of claim 1, wherein each GMI sensor comprises one of an amorphous-metal wire or fiber, a metal wire or fiber comprised of one or more layers of soft-magnetic material, and an electroplated metal wire or fiber.

8. The reader of claim 1, wherein the processing circuitry is configured to decode and evaluate the output generated by the detection circuitry to determine if the at least one marker element is valid.

9. The reader of claim 1, wherein the article is an access key card.

10. The reader of claim 1, wherein the processing circuitry is configured to: process the output generated by the detection circuitry and generate an output string representing the encoded data; decode the output string to determine whether the generated output string represents a valid code; and generate decision output based on the decoded output string.

11. The reader of claim 10, wherein the output string is binary.

12. The reader of claim 1, wherein the one or more solenoids and one or more GMI sensors are in close proximity, and wherein the one or more solenoids is upstream of the one or more GMI sensors along the read path.

13. The reader of claim 1, wherein the one or more solenoids is wrapped around a magnetic circuit through which the one or more GMI sensors pass.

14. A read head for an electronic article identification system comprising:
one or more solenoids configured to generate a localized magnetic field that intersects a read path along which an article to be identified is to be moved, for locally exciting portions of at least one marker element on the article as the article moves through the localized magnetic field and for causing the at least one marker element to generate a magnetic field that varies depending on encoded data carried by the at least one marker element at said excited portions;
one or more giant magnetoimpedance (GMI) sensors configured to detect the magnetic field generated by the at least one marker element; and
detection circuitry configured to generate output representing the encoded data based on the magnetic field detected by the one or more GMI sensors.

15. The read head of claim 14, wherein the localized magnetic field is for causing magnetic dipoles of marker element material to flip thereby to cause the at least one marker element to generate the magnetic field.

16. The read head of claim 14, wherein the one or more solenoids is driven by a probe field drive circuit.

17. The read head of claim 16, wherein the probe field drive circuit operates in the range of 1 to 100 kHz.

18. The read head of claim 14, wherein the one or more GMI sensors is driven by an alternating current drive circuit.

19. The read head of claim 18, wherein the alternating current drive circuit operates in the range of approximately 0.1 to 50 GHz.

20. The read head of claim 14, wherein each GMI sensor comprises one of an amorphous-metal wire or fiber, a metal wire or fiber comprised of one or more layers of soft-magnetic material, and an electroplated metal wire or fiber.

21. The read head of claim 14, wherein the one or more solenoids and one or more GMI sensors are in close proximity, and wherein the one or more solenoids is upstream of the one or more GMI sensors along the read path.

22. The read head of claim 14, wherein the one or more solenoids is wrapped around a magnetic circuit through which the one or more GMI sensors pass.

* * * * *